United States Patent
Leung et al.

(10) Patent No.: US 7,899,303 B2
(45) Date of Patent: Mar. 1, 2011

(54) DVD RECORDER AND PVR INSTANT ON ARCHITECTURE

(75) Inventors: Ho-Ming Leung, Cupertino, CA (US); Elliot Sowadsky, San Jose, CA (US); Suryanaryana M. Potharaju, San Jose, CA (US); Peter G. Panagas, Jr., Santa Clara, CA (US)

(73) Assignee: LSI Corporation, Milpitas, CA (US)

( * ) Notice: Subject to any disclaimer, the term of this patent is extended or adjusted under 35 U.S.C. 154(b) by 1246 days.

(21) Appl. No.: 11/497,890

(22) Filed: Aug. 2, 2006

(65) Prior Publication Data

US 2008/0031588 A1 Feb. 7, 2008

(51) Int. Cl.
*H04N 5/91* (2006.01)
*H04N 5/63* (2006.01)

(52) U.S. Cl. .......................................... 386/83; 348/730
(58) Field of Classification Search ................. 386/83; 713/2, 323; 348/730; 718/108
See application file for complete search history.

(56) References Cited

U.S. PATENT DOCUMENTS

| | | | |
|---|---|---|---|
| 6,157,970 A * | 12/2000 | Gafken et al. ............... 710/27 |
| 6,981,161 B2 * | 12/2005 | Koo ............................ 713/310 |
| 7,640,440 B2 * | 12/2009 | Reece et al. ................. 713/300 |
| 2004/0243649 A1 * | 12/2004 | Husemann et al. .......... 707/201 |
| 2005/0094036 A1 * | 5/2005 | Tichelaar ..................... 348/730 |
| 2007/0101392 A1 * | 5/2007 | Soin et al. .................... 725/132 |
| 2007/0266264 A1 * | 11/2007 | Lewites et al. .............. 713/300 |

\* cited by examiner

*Primary Examiner*—Victor Kostak
(74) *Attorney, Agent, or Firm*—Christopher P. Maiorana, PC

(57) ABSTRACT

A method for transitioning a video system is disclosed. The method generally includes a first step for (A) executing in a processing circuit a standby code stored in a nonvolatile memory while the video system is in an off state, the off state defining a low power configuration for the processing circuit and a power off condition for the video system, the standby code being responsive to a plurality of wake up conditions to wake up the video system. In a second step, the method may (B) store an application code in a volatile memory while in the off state, the application code configured to operate the video system while in an on state of the video system. The method generally includes a third step for (C) transitioning from the off state to the on state upon detection of at least one of the wake up conditions. A step for (D) executing in the processing circuit the application code while in the on state to decode video may also exist in the method.

20 Claims, 6 Drawing Sheets

DVD RECORDER AND PVR INSTANT ON ARCHITECTURE

FIELD OF THE INVENTION

The present invention relates to video recorders generally and, more particularly, to a DVD recorder and PVR instant on architecture.

BACKGROUND OF THE INVENTION

An "instant on" feature in a digital versatile disk (DVD) recorder or a personal video recorder (PVR) is desirable for several reasons. Customers have expressed concerns that boot up times of conventional DVD/PVR recorders are too long. Some lower-cost DVD/PVR recorders will take up to several minutes to boot before becoming usable. Furthermore, as the DVD/PVR recorder software becomes more complicated, the boot up time becomes longer. "Impulse recording" is also a desirable feature for a DVD/PVR recorder. To implement an impulse record feature, the DVD/PVR recorder is equipped with a "record" button on a front plane. When the record button is pressed, the DVD/PVR recorder should start recording live programming without an obvious time lag, even if the DVD/PVR recorder was shut off at the time of the button press. Unfortunately, many conventional DVD/PVR recorders wait tens of seconds before the recording actually begins.

Several conventional DVD/PVR recorders reduce the waiting period by maintaining the internal circuitry in a powered condition at all times. Such DVD/PVR recorders give the impression of being switched off by dimming or blanking any indicators on the front panel. However, powering the internal circuitry all of the time does not allow a DVD/PVR recorder to comply with certain government regulation, such as the "Energy Star" logo regulation. An Energy Star compliant DVD/PVR recorder will consume very little power when off.

SUMMARY OF THE INVENTION

The present invention concerns a method for transitioning a video system. The method generally comprises a first step for (A) executing in a processing circuit a standby code stored in a nonvolatile memory while the video system is in an off state, the off state defining a low power configuration for the processing circuit and a power off condition for the video system, the standby code being responsive to a plurality of wake up conditions to wake up the video system. In a second step, the method may (B) store an application code in a volatile memory while in the off state, the application code configured to operate the video system while in an on state of the video system. The method generally includes a third step for (C) transitioning from the off state to the on state upon detection of at least one of the wake up conditions. A fourth step for (D) executing in the processing circuit the application code while in the on state to decode video may also exist in the method.

The objects, features and advantages of the present invention include providing a digital versatile disk (DVD) recorder and/or personal video recorder (PVR) instant on architecture that may (i) consume very little power when in an off state, (ii) transition from the off state to an on state in a short time, (iii) maintain a last known on state condition of the system in a volatile memory while in the off state, (iv) record electronic programming guide information and/or other data while in the off state, (v) update a real time clock while in the off state and/or (vi) enable manufacturer customization of the wake up criteria.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
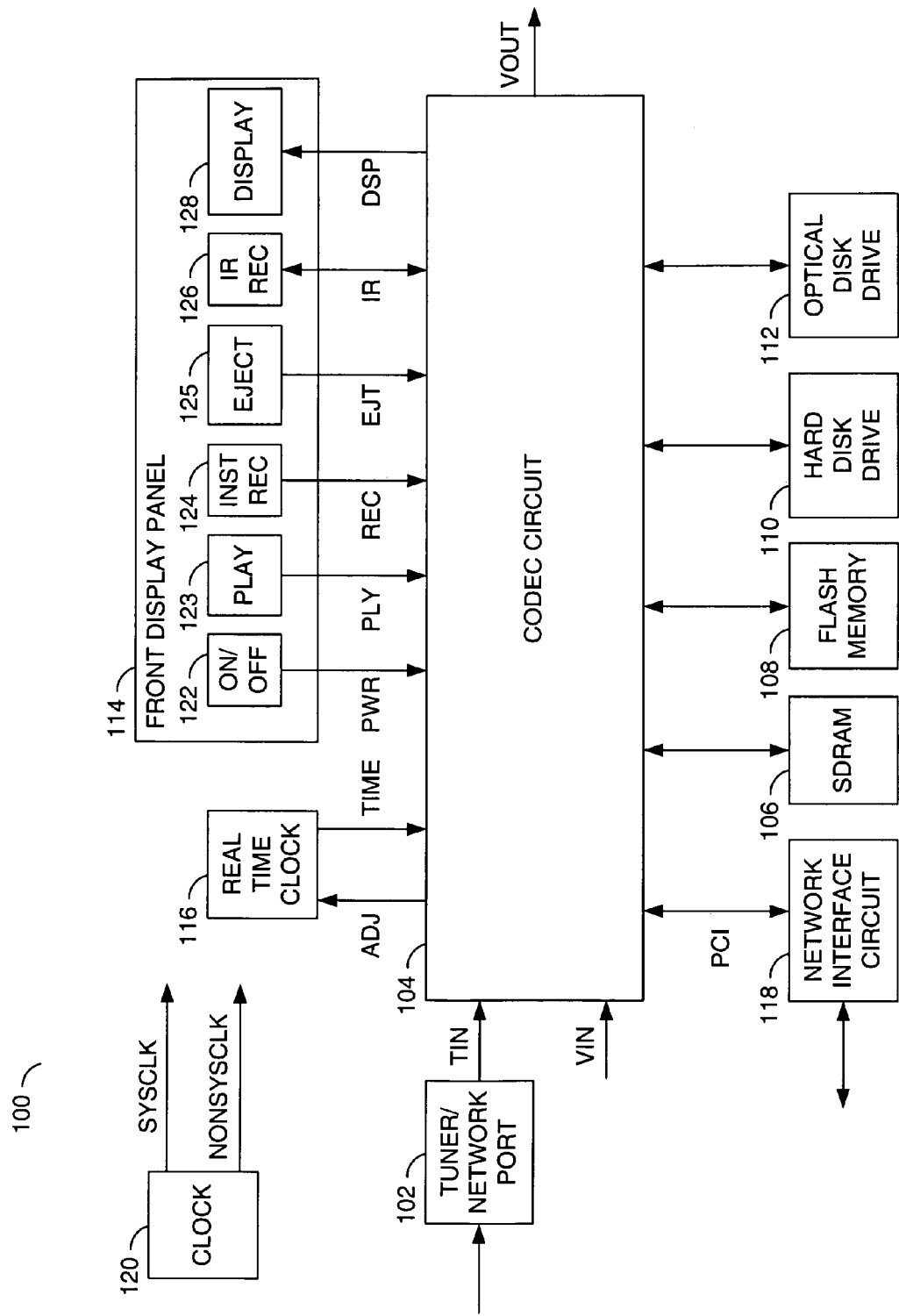
FIG. 1 is a block diagram of a system in accordance with a preferred embodiment of the present invention.

Referring to FIG. 1, a block diagram of a system 100 is shown in accordance with a preferred embodiment of the present invention. The system (or apparatus) may be referred to as a video recorder, a video decoder and/or a video system. The video system 100 may be operational to record video content to a storage device for subsequent playback and/or decode video content received from an external source. The video recorder 100 may implement a digital versatile disk (DVD) recorder, a PVR, a set-top box and/or a digital television decoder module.

The video system 100 generally comprises a circuit (or module) 102, a circuit (or module) 104, a circuit (or module) 106, a circuit (or module) 108, a circuit (or module) 110, a circuit (or module) 112, a circuit (or module) 114, a circuit (or module) 116, a circuit (or module) 118 and a circuit (or module) 120. An input signal (e.g., VIN) may be received by the circuit 104. A signal (e.g., TIN) may be transferred from the circuit 102 to the circuit 104. The circuit 104 may present an output signal (e.g., VOUT). A signal (e.g., TIME) may be presented from the circuit 116 to the circuit 104. The circuit 104 may present a signal (e.g., ADJ) back to the circuit 116. The circuit 114 may present a signal (e.g., PWR) to the circuit 104. A signal (e.g., PLY) may be received by the circuit 104 from the circuit 114. A signal (e.g., REC) may also be presented from the circuit 114 to the circuit 104. The circuit 114 may present a signal (e.g., EJT) to the circuit 104. Another signal (e.g., IR) may be presented from the circuit 114 to the circuit 104. The circuit 104 may present a signal (e.g., DSP) back to the circuit 114. The circuit 106 may be coupled to the circuit 104 to exchange data and computer software instructions. The circuit 108 may also be coupled to the circuit 104 to exchange data and computer software instructions. The circuit 110 may communicate with the circuit 104 to exchange video information. The circuit 112 may also communicate with the circuit 104 to exchange video information.

The circuit 102 may be referred to as a tuner and/or a network port. The tuner/network port 102 may be operational to select among several channels/network sources of programming to generate the signal TIN. The channels of programming may be received from a cable, satellite receiver and/or an air antenna. The network sources of programming may be received via the Internet, a wide area network, local area network, intra-nets and the like. The resulting signal TIN may carry a transport stream having one or more video programs. The signal TIM may also carry other types of data including, but not limited to, still images and sound data.

The circuit 104 may be referred to as a code/decode (codec) circuit or a processing circuit. The codec circuit 104 is generally operational to decode the video content received from (i) the tuner 102 via the signal TIN, (ii) from the circuit 110 and (iii) from the circuit 112. The circuit 104 may also receive un-encoded video content in the signal VIN. The signal VOUT may be generated by the codec circuit 104 in an analog format and/or a digital format. The signal VOUT may be suitable for driving a video display. Furthermore, the codec circuit 104 may be operational to encode the video content received in the signal VIN for storage within the circuit 110 and/or the circuit 112 in compressed form. The codec circuit 104 may also format and route the compressed video received via the signal TIN for storage within the circuit 110 and/or the circuit 112.

The circuit 106 may be referred to as volatile memory. The volatile memory 106 may be fabricated independently of the codec circuit 104. Furthermore, the volatile memory 106 may be implemented as a synchronous dynamic random access memory (SDRAM). As such, the volatile memory 106 may also be referred to as either an external memory and/or an SDRAM. Other memory technologies may be implemented to meet the criteria of a particular application. The SDRAM 106 may be used to store data temporarily, instructions and portions of the video information.

The circuit 108 may be referred to as a nonvolatile memory. The nonvolatile memory 108 may be fabricated independently of the codec circuit 104. In some embodiments, the nonvolatile memory 108 may be implemented as a FLASH memory. Therefore, the nonvolatile memory 108 may also be referred to as a FLASH memory. The FLASH memory 108 may be used for permanent storage of (i) software instructions and (ii) various system parameters. The FLASH memory 108 may also be used for temporary storage of data that may change over time, such as Electronic Programming Guides (EPG) and broadcast time stamps.

The circuit 110 may be referred to as a hard disk drive. The hard disk drive 110 may be used for recording video programming in encoded/compressed form. The hard disk drive 110 may be optional to the video system 100.

The circuit 112 may be referred to as an optical disk drive. The optical disk drive 112 may be used for playback of video programming from removable optical disks. In some embodiments, the optical disk drive 112 may also be a writeable drive capable of recording video content to writeable optical media. The optical disk drive 112 may be optional to the video system 100. Generally, an implementation of the video system 100 may have one or both of the hard disk drive 110 and/or the optical disk drive 112. Other storage technologies may be implemented to meet the criteria of a particular application.

The circuit 114 may be referred to as a front display panel. The front display panel 114 may include multiple sensors (e.g., switches and buttons), a wireless sensor (e.g., infrared or radio frequency) and one or more displays for receiving commands from a user and presenting information to the user. The front panel display 114 may generate the signal PWR based on an on/off button 122. The signal PWR may carry commands to power on the video system 100 (e.g., transition to an on state) and to power off the video system 100 (e.g., transition to an off state). The signal PLY may be asserted by a "play" switch 123 in the front panel display 114. The signal PLY may instruct the codec circuit 104 to being playing a recorded program (e.g., from the optical disk driver 112 and/or the hard disk drive 110). Assertion of the signal PLY while the video system 100 is in the off state may also be interpreted by the codec circuit 104 as a command to transition the video system 100 into the on state.

The signal REC may be asserted by an "instant record" switch 124 in the front panel display 114. The signal REC may instruct the codec circuit 104 to begin recording video information from the signal TIN and/or VIN as soon as practical. Assertion of the signal REC while the video system 100 is in the off state may also be interpreted by the codec circuit 104 as a command to transition the video system 100 into the on state. The signal EJT may be asserted from an "eject" switch 125 in the front panel display 114. Assertion of the signal EJT while the video system 100 is in the off state may be interpreted by the codec circuit 104 as a command to transition the video system 100 into the on state.

The signal IR may be generated by an infrared receiver 126 in the front display panel 114 based on information received from a wireless remote controller. The signal IR may include instructions to power on, power off, begin recording, end recording, play, eject and the like. The codec circuit 104 may present the signal DSP to graphic display 128 within the front panel display 114. The information in the signal DSP may be viewable by the user through the graphic display 128.

The circuit 116 may be referred to as a real time clock (RTC). The real time clock 116 may be operational to keep track of a time value and a date value. The time/date information may be presented from the real time clock 116 in the signal TIME. Adjustments may be made to the time value and/or the date value using information received from the codec circuit 104 in the signal ADJ. In some embodiments, the real time clock 116 may be part of the codec circuit 104. In other embodiments, the real time clock 116 may be physically separate from the codec circuit 104.

The circuit 118 may be referred to as a network interface circuit. The network interface circuit 118 may be operational to communicate external to the video system 100 over a network (e.g., Internet). The network interface circuit 118 may provide information to the codec circuit 104 such as, but not limited to, electronic programming guides and broadcast time stamps. In some embodiments, the electronic programming guides and/or broadcast time stamps may be received through the tuner 102.

The circuit 120 may be referred to as a clock circuit. The clock circuit 120 may be operational to generate at least one system clock signal (e.g., SYSCLK). The system clock signal SYSCLK may be controllable by the codec circuit 104 to operate at multiple frequencies. One or more non-system clock signals (e.g., NONSYSCLK) may also be generated by the clock circuit 120. The non-system clock signals NONSYSCLK may be selectively enabled and disabled by the codec circuit 104.

Figure 2:
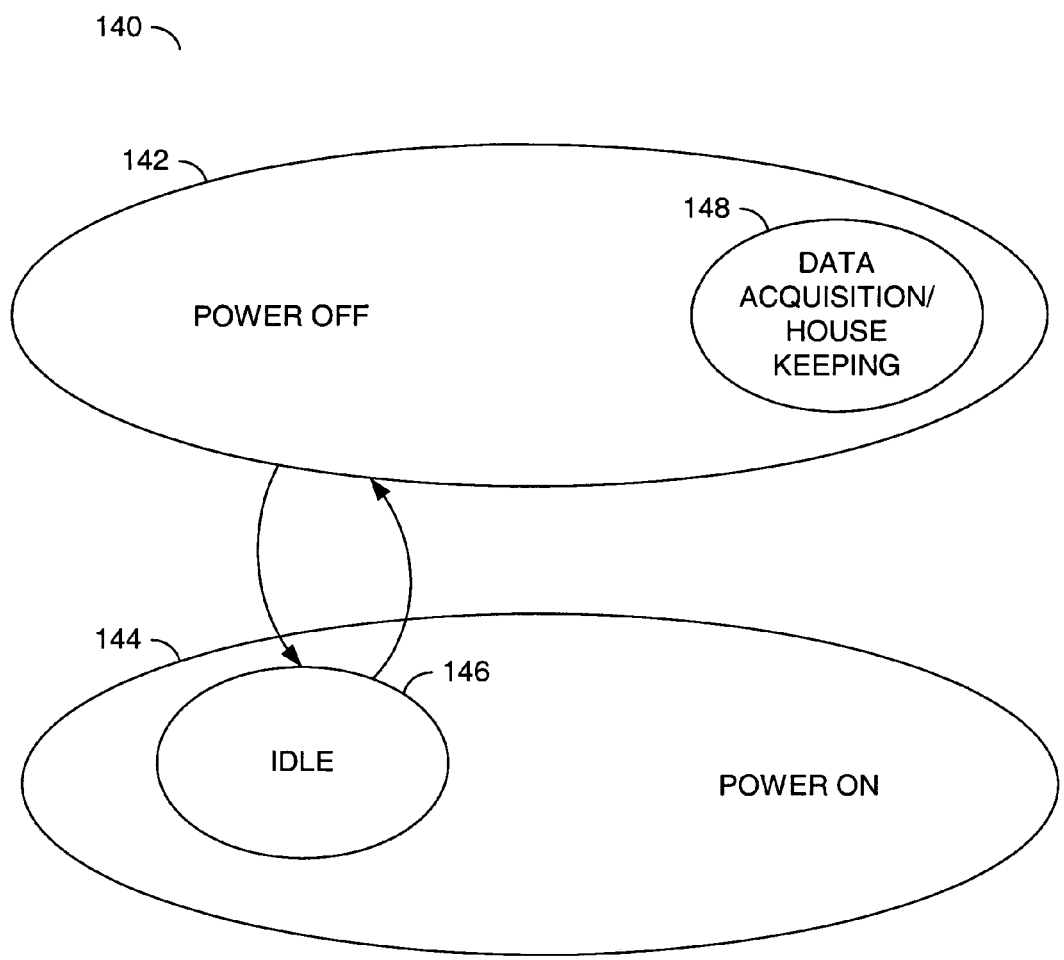
FIG. 2 is a state transition diagram for the system.

Referring to FIG. 2, a state transition diagram 140 for the video system 100 is shown. The state transition diagram 140 generally comprises a power off state 142 and a power on state 144. The power on state 144 may include a sub-state 146, referred to as an idle state. The power off state 142 may include a sub-state 148, referred to as a data acquisition and house keeping state.

At an initial power up, and any power up after the complete loss of electrical power, the video system 100 may transition through the idle state 146. Thereafter, the video system 100 may transition between the power on state 144 and the power off state 142 based on commands received from the user via the front panel display 114 and the real time clock 116. While in the power on state 144, the video system 100 may have full operational capabilities and consume a modest amount of electrical power. While in the power off state 142, the video system 100 may be considered powered down. However, while in the power off state 142, at least the clock circuit 120, the real time clock 116, the codec circuit 104, the SDRAM 106 and the FLASH memory 108 may operate at reduced power levels.

In the power off state 142, the video system 100 generally has most of the logic and circuits in a powered off condition. Several established methods exist to shut off digital circuits and/or analog circuits. Digital circuits may be shut off by stopping the system clocks. Analog circuits may be shut off by shutting down any current generating band-gap reference circuitry. Furthermore, if any nonessential digital circuits and/or analog circuits are powered by independent voltage regulators, the voltage regulators may be shut down by an on-chip embedded processor within the codec circuit 104.

In the power off state 142, the embedded processor in the codec circuit 104 may remain running at a much lower frequency than in other states. Typical a frequency of around 1 megahertz (MHz) may be generated by the clock circuit 120 for the clock signal SYSCLK to drive the codec circuit 104. Furthermore, the system SDRAM 106 may be commanded into a low power auto-refresh (or self-refresh) mode. In the self-refresh mode, the SDRAM 106 cannot provide (e.g., read) any useful data. However, the contents of the SDRAM 106 may be self preserved. The embedded processor inside the codec circuit 104 may continue executing microcodes out of the FLASH memory 108 and/or an instruction cache in the codec circuit 104.

The video system 100 may leave the power off state 142 and enter another state by increasing the system clock frequency and applying power to other appropriate digital circuitry and analog circuitry. The video system 100 normally does not do much in the power off state 142, except monitor the real time clock value, the remote control for user command and the switches/buttons on the front display panel 114 to determine when to wake up as commanded and/or wake up if pre-programmable recording events have arrived. In an example implementation, the power consumption of the codec circuit 104 in the power off state 142 is about 200 milliwatts while the whole video system 100 generally consumes about 0.5 watts.

In the power on state 144, the video system 100 may have full processing capabilities and most of the circuits may be powered. Both the SDRAM 106 and the FLASH memory 108 may be operating in respective full power modes. The embedded processor in the codec circuit 104 generally executes directly from the instruction cache and/or from the SDRAM 106 while in the power on state 144. In the example implementation, the power consumption of the codec circuit 104 in the power on state 144 is about 1.3 watts.

Any of one or more defined wake up events may cause the video system 100 to transition from the power off state 142 to the power on state 144. The wake up events may include, but are not limited to, reception of the signal IR from the IR receiver 126 indicating that a remote control power key press has been detected, reaching an auto wake up time based on the signal TIME, assertion of the signal PWR from the on/off switch 122 and/or assertion of the signal REC, indicating a press of the instant record button 126. Other wake up type sensors and/or conditions may be implemented to meet the criteria of a particular application.

The transition to the power on state 144 from the other states may be almost instantaneously for several reasons. First, the embedded processor in the codec circuit 104 is already running before the transition to the power on state 144 begins. As such, the embedded processor may not have to be booted. From a software point of view, the condition of the embedded processor generally remains unchanged from before the transition until after the transition to the power on state 144.

The system clock frequency is generally increased before the state transition occurs. Therefore, all circuitry operating from the system clock signal SYSCLK may be running at full speed before the transition to the power on state 144 begins. Circuitry unpowered while in the power off state 142 generally wakes up with the system clock already at the high frequency.

The SDRAM 106 may operate in the self-refresh mode while in the power off state 142 to preserve the contents stored therein. As such, data for the video system 100 may be preserved from a point in time when the video system 100 last left the power on state 144. Upon returning to the power on state 144, the data may be readable from the SDRAM 106 and thus the power on-power off-power on cycle may be transparent to most of the software.

Several house keeping tasks may be performed while in the power off state 142 that generally do not utilize the full processing capabilities. The optional data acquisition and house keeping sub-state 148 may define a configuration for performing data acquisition tasks and house keeping tasks. While in the data acquisition and house keeping state 148, the system clock signal SYSCLK (and thus the embedded processor) may be running at an intermediate frequency (e.g., at approximately 10 MHz) that is greater than the minimum frequency normally used within the off state 142.

The SDRAM 106 may still operate in the auto-refresh mode, but FLASH memory 108 may be running in a normal mode in the data acquisition and house keeping state 148. The embedded processor of the codec circuit 104 may execute microcodes directly from the FLASH memory 108 and/or the instruction cache. Tasks performed in the data acquisition and house keeping state 148 generally include, but are not limited to, (i) downloading EPG data from the network interface circuit 118 and/or the tuner 102, (ii) calibration of the real time clock 116 from broadcast time stamps and (iii) internal diagnostic testing. In some embodiments, the power consumption of the codec circuit 104 in the data acquisition and house keeping sub-state 148 may be much less than 1 watt while the whole video system 100 generally consumes several watts. The video system 100 may transition from the data acquisition and house keeping sub-state 148 back to the normal power off state 142 when the task or tasks that originally invoked the data acquisition and house keeping sub-state 148 have ended.

Figure 3:
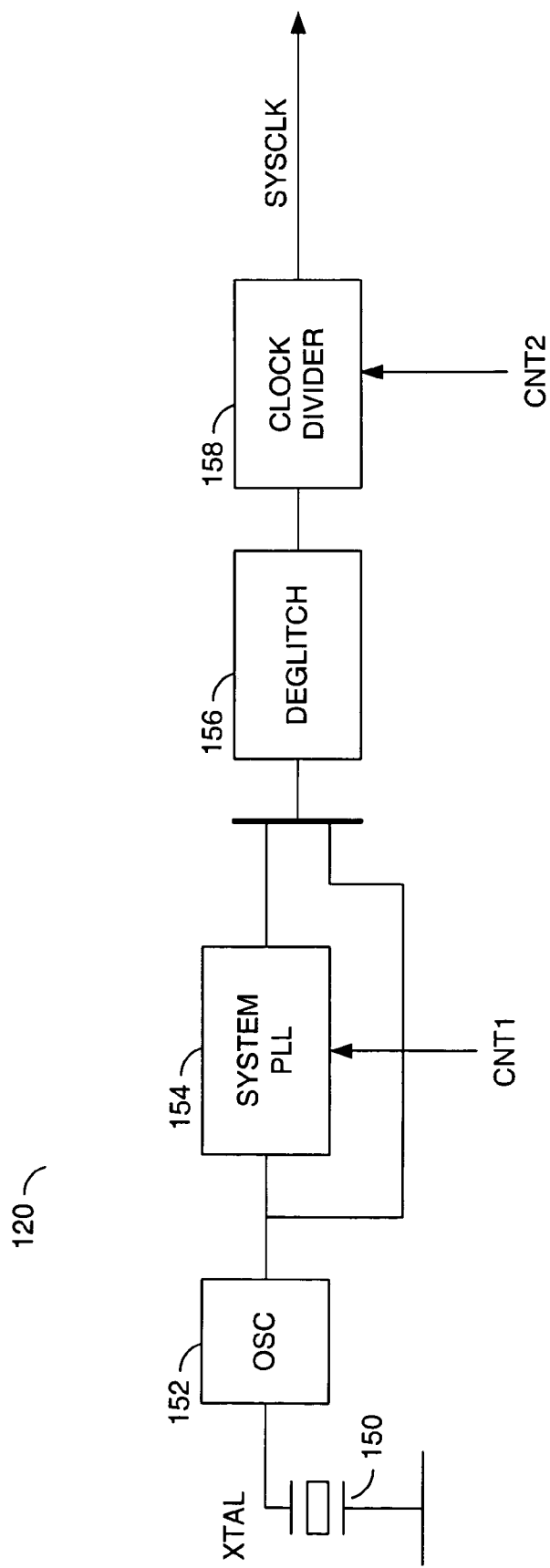
FIG. 3 is a detailed block diagram of a clock circuit and an external crystal.

Referring to FIG. 3, a detailed block diagram of the clock circuit 120 and an external crystal 150 is shown. The clock circuit 120 generally comprises an oscillator 152, a phase lock loop 154, a deglitcher 156 and a clock divider 158. The phase lock loop 154 may receive a control signal (e.g., CNT1) from the coder circuit 104. Another control signal (e.g., CNT2) may be received by the clock divider 158 from the codec circuit 104. Different operational states/sub-states (e.g., 142, 144 and 148) generally utilize different system clock frequencies.

The external low-cost crystal 150 may be used to provide a low jitter constant clock reference. Typically the frequencies of the crystal 150 are one among 13.5 MHz, 27 MHz, 24.576 MHz, or 12 MHz. Other frequencies may be generated to meet the criteria of a particular application.

The oscillator 152 may be operational to generate the initial system clock signal. The initial system clock signal may be created at an intermediate frequency.

The system PLL 154 may be operational to generate a high frequency internal system clock for the normal power on state 144. While in the power on state 144, the various circuits may be run at different frequencies depending on the application. As such, the system clock may be divided down by the clock divider 158 to save power. The clock divider 158 may be controlled by the control signal CNT2.

For the power off state 142 and/or the data acquisition and house keeping sub-state 148, the PLL 154 may be shut down using the control signal CNT1 to save power. The crystal oscillator 150-152 generally provides the intermediate system clock frequency and the clock divider 158 divides the system clock to a minimum frequency. In the data acquisition and house keeping state 148, the clock divider 158 may be programmed via the signal CNT2 to a pass through mode in which the system clock would not be divided. The undivided system clock may generate a lower clock frequency such as 13.5 MHz (e.g., the intermediate frequency) for the entire system. In the normal power off state 142, the clock divider 158 may be activated to further divide down the oscillator 152 output signal to about 1 MHz (e.g., the minimum frequency) that may keep the power consumption to a minimum while the embedded processor may still do some simple scheduling tasks. In an "Instant On" implementation, the system clock frequency may be switched instantly to accommodate the different states. Therefore, the deglitch logic 154 may be operational to smooth the system clock frequency transitions.

Figure 4:
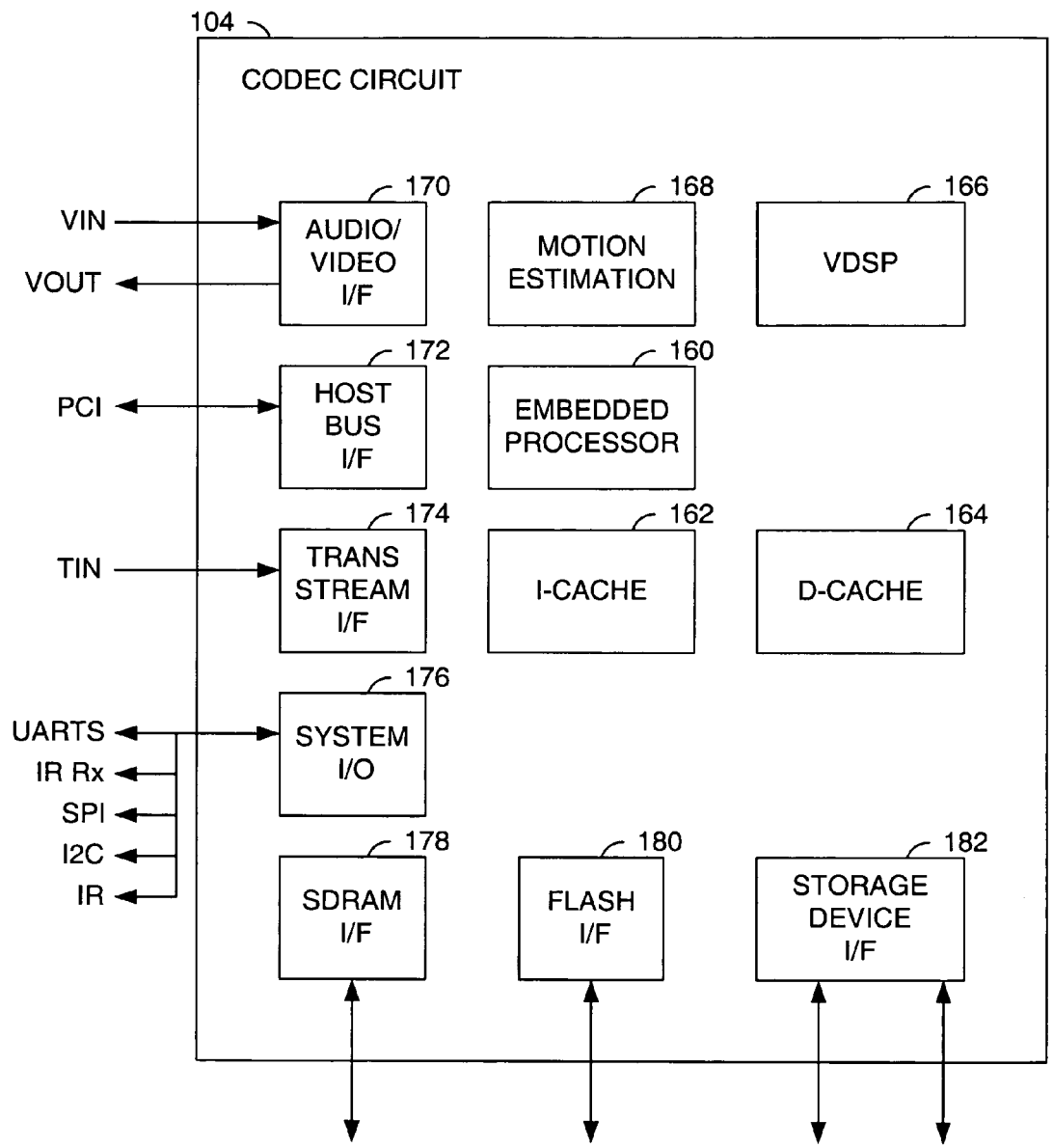
FIG. 4 is a detailed block diagram of a code/decode circuit.

Referring to FIG. 4, a detailed block diagram of the codec circuit 104 is shown. The codec circuit 104 generally comprises the embedded processor circuit (or module) 160, the instruction cache circuit (or module) 162, the data cache circuit (or module) 164, a video digital signal processor circuit (or module) 166, a motion estimator circuit (or module) 168, an audio/video interface circuit (or module) 170, a generic host bus interface circuit (or module) 172, a transport stream interface circuit (or module) 174, a system input/output (S10) circuit (or module) 176, an SDRAM interface circuit (or module) 178, a FLASH interface circuit (or module) 180 and a storage device interface (or module) 182.

The audio/video circuit 170 may receive the signal VIN and generate the signal VOUT. The generic host bus interface circuit 172 may communicate with the network interface circuit 118 via a system bus (e.g., a PCI bus). The transport stream interface circuit 174 may receive the transport stream signal TIN. The system I/O circuit 176 may communicate with the real time clock 116 and the front display panel 114. The SDRAM interface circuit 178 may communicate with the SDRAM 106. The FLASH interface circuit 180 may communicate with the FLASH memory 108. The storage device interface circuit 182 may communicate with the hard disk drive 110 and/or the optical disk drive 112.

Figure 5:
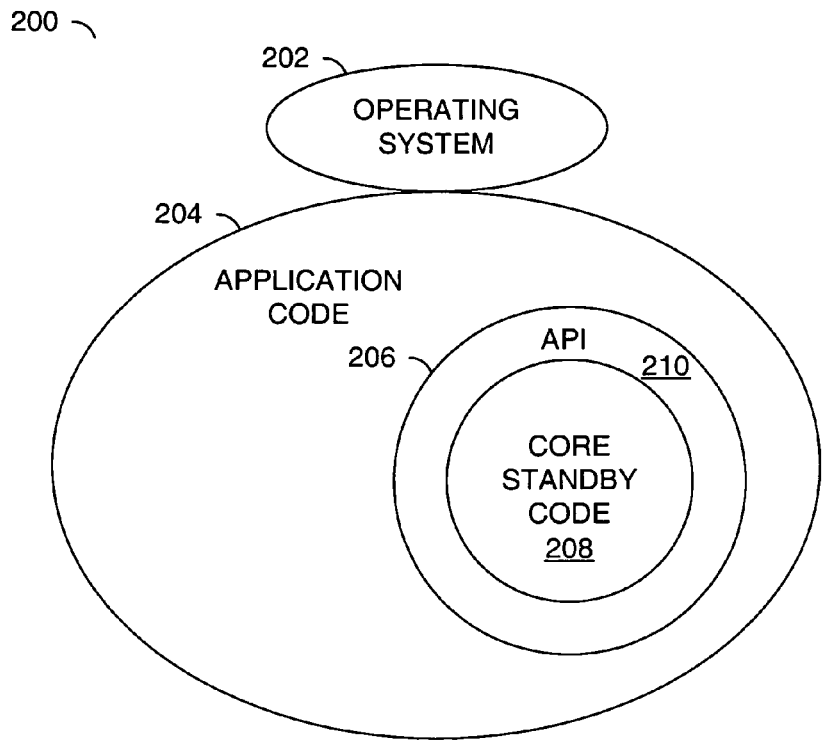
FIG. 5 is a diagram of the software modules.

Referring to FIG. 5, a diagram of the software 200 is shown. The software 200 of the video system 100 generally comprises an operating system 202, the application code (or component) 204 and the standby code (or component) 206. The standby code 206 generally enables the standby features (e.g., the power off state 144 and the data acquisition and house keeping state 148 features). The standby features may be coded in the standby code 206.

The standby code 206 generally comprises an application program interface (API) code 208 and the core standby code 210. The API 208 generally enables the power off state 142 and the core standby code 210 executes alone while in the power off state 142. The API 208 may be exposed in an identical fashion on all systems incorporating the codec circuit 104 for all manufacturers. The single API 208, named SystemStandby, may be simultaneously an entry point into and an exit point from the power off state 142. SystemStandby may be invoked by a single call. The SystemStandby call may be synchronous and return from the call on exit from the power off state 142. The API code 208 may be customized by the manufacturer of the video system 100 and/or the manufacturer of the codec circuit 104 to account for differences among various video systems. The core standby code 210 may be coded specifically to the codec circuit 104.

The standby code 206 procedures executed to enter the power off state 142 may be as follows:
Notify the application code 204 that a state transition to the power off state 142 is in progress;
Ensure that all embedded processor interrupts are made silent;
Ensure that all direct memory access (DMA) operations have ceased;
Stop all sequencers in use;
Unbind all sink and source elements from any sequencer to which connected;
Save the states of the connections before unbinding;
Tri-state the pins of the codec circuit 104 connected to external devices, except pins used while in the power off state 142;
Place the storage device drivers in either a SLEEP mode or an OFF mode;
Stop all DMA traffic;
Store one or more conditions of the hardware;
Move the code execution of the embedded processor from the SDRAM 106 to the FLASH memory 108;
Move any state data, context data and/or any other data useful for recovering from a hard reset (e.g., loss of AC power) into the FLASH memory 108;
Disable all interrupts to the embedded processor;
Disable a data cache of the embedded processor;
Place the SDRAM 106 in the self-refresh mode;
Disable (e.g., power off) all silicon-based clocks except the main system clock; and
Move the system clock from the high frequency to the minimum frequency.

The standby code 206 procedures executed while in the power off state 142 may be defined as follows:
Wait for a reason to wake up and/or talk to other silicon chips to acquire data, such as a program guide and/or other scheduling information;
Update state data, context data and/or any other data useful for recovering from a hard reset;
Adjust the values of the real time clock 116; and
Change the system clock frequency between the minimum frequency and the intermediate frequency, if implemented.

On exiting the power off state 142, the standby code 206 may reverse the above processes returning from System-Standby as follows:
Move the system clock from the minimum frequency to the high frequency;
Enable (e.g., power on) all silicon-based clocks;
Place the SDRAM 106 in a normal mode;
Enable the data cache for the embedded processor;
Enable the embedded processor interrupts;
Restart the sequencers;
Bind the sink and source elements to any sequencer to which previously connected;
Enable DMA traffic;
Restore the states of the connections;
Place the storage device drivers in an ON mode;
Release the codec circuit 104 pins from tri-state;
Restore to the SDRAM 106 the state data, context data and/or other data changed while in standby;
Restore the pre-transition conditions of the hardware; and
Return to the application code 204.

When in the power off state 142, the standby code 206 may maintain availability to certain functions as follows:

Minimal hardware is available (e.g., system input/outputs, such as an inter-integrated circuit (I2C) bus, a serial peripheral interface (SPI) bus, a FLASH memory interface, a front display panel interface, a real time clock interface, etc.).

The entire application code 204 that was running upon transition into the idle sub-state 148 may be maintained in the SDRAM 106 waiting to run again from where left upon exiting the power off state 142. By implementing the notification to the application code 204 that entry to the power off state 142 is about to occur, exiting the power off state 142 may be performed in a minimum amount of time (e.g., about 100 milliseconds). A first thing that the application code 204 may notice after waking up is the return from the SystemStandby call. Thereafter, an application specific power-on-from-idle sequencing may begin.

The standby code 206 is generally located in the FLASH memory 108 separately from the primary application code 204. The standby application code 206 generally does not reference the operating system code 202 or rest of the application code 204. Instead, the standby code 206 may contain a minimal body of code to serve a primary purpose to monitor various inputs for a reason to wake up. The standby code 206 may execute from the FLASH memory 108. However, if the standby code 206 space measures below a size of the instruction cache (e.g., 16 kilobytes (KB)), the standby code 206 may eventually execute entirely from the instruction cache.

The optical disk driver 112 and the hard disk drive 110 generally consume some time preparing for play/record. As such, a process to restart the drives should begin very quickly after the return from SystemStandby( ). In some embodiments, a separate thread may be spawned to prepare the drives allowing the remaining wake-up steps to continue as quickly as possible.

The real time clock 116 timer is commonly active in both the power on state 144 and power off state 142. The real time clock 116 may be used as part of the standby application to wake up the video system 100 at a programmable time.

All general purpose inputs/outputs configured as inputs may be potential candidates to wake up the video system 100. For example, the standby code 206 may poll one or more general purpose inputs for a state transition and engage the wake up sequence upon detection. The SPI bus, the I2C bus and the IR receive port are generally active during the power off state 142. The standby code 206 could, for example, be programmed to poll an external device via the SPI bus, I2C bus and/or IR receive port for a given wake up criteria, such as a given register value changing to a predetermined value.

As the standby code 206 generally runs from the FLASH memory 108 (at least initially), a minimal amount of power is generally consumed by the flash device. Typically the power consumption diminishes quickly after entering the power off state 142. As the standby application code 206 executes, the code 206 may be automatically fetched into the instruction cache 162. Furthermore, many conventional FLASH memory devices support an automatic low power mode, such that read operations cease. Therefore, the power consumed by the FLASH memory 108 is generally reduced to a minimal level shortly after entering the power off state 142. Minimal power may also be consumed by the SDRAM 106 as the SDRAM 106 may be placed into a self-refresh mode to maintain the state of the main application on entry to standby.

Conventional ATA drives generally implement a power management by way of an ATA/ATAPI command set. Consideration should be made regarding the drives 110 and/or 112 in the video system 100 to either use the ATA/ATAPI specific low power mode or add a software controllable switch to disable power to the drives 110 and/or 112 entirely.

In some embodiments, the front display panel 114 may include a microcontroller. In such embodiments, a communication method (e.g., the SPI bus) between the codec circuit 104 and the front panel microcontroller may be in use during the power on state 144 and during the power off state 142.

Some embodiments of the video system 100 may implement a non-microcontroller (referred to as a "zero micom") front display panel 114 design. In such embodiments, the standby code 206 generally becomes slightly more complicated due to responsibly for monitoring the sensor inputs and updating the time display of the front display panel 114.

Figure 6:
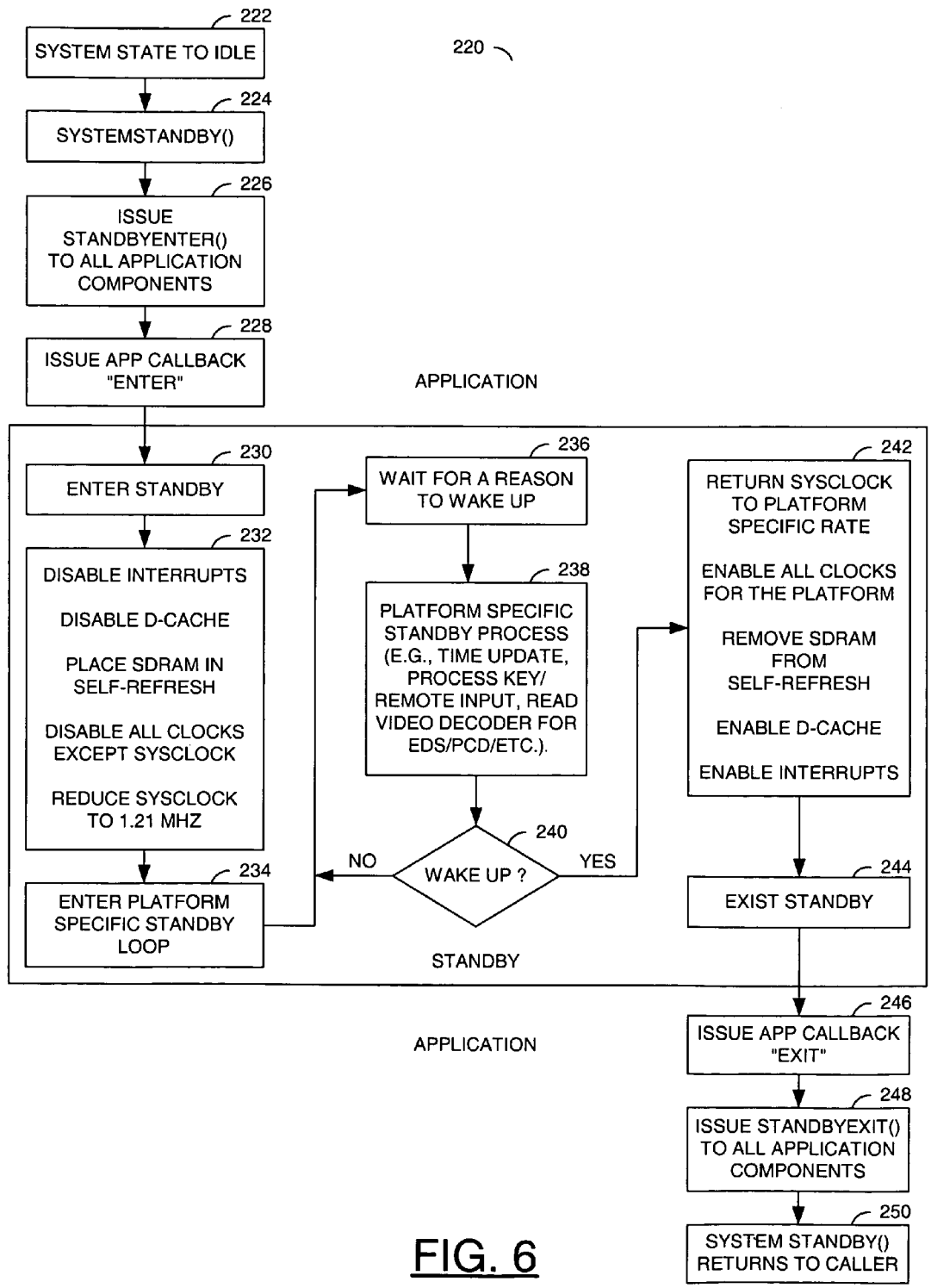
FIG. 6 is a flow diagram of a method of operation.

Referring to FIG. 6, a flow diagram of a method 220 of operation is shown. The method (or process) 220 generally comprises a step (or block) 222, a step (or block) 224, a step (or block) 226, a step (or block) 228, a step (or block) 230, a step (or block) 232, a step (or block) 234, a step (or block) 236, a step (or block) 238, a step (or block) 240, a step (or block) 242, a step (or block) 244, a step (or block) 246, a step (or block) 248 and a step (or block) 250. The method 220 may be implemented in part by the application code 204 and in part by the standby code 206.

Upon detection of a command to power down the video system 100, the application code 204 may transition to the idle sub-state 148 in the step 222. A call (e.g., SystemStandby( )) may be made in the step 224 to begin the power down transition. An instruction to enter standby (e.g., StandbyEnter( )) may be issued to all components of the application code 204 in the step 226. An entry pointer (e.g., ENTER) may be called in the step 228.

The standby code 206 may be entered in the step 230. The standby code 206 may reduce power consumption in the step 232. Power reduction may include, but is not limited to, (i) disabling interrupts, data cache and non-system clocks, (ii) placing the SDRAM into self-refresh and (iii) lowering the frequency of the system clock. The interrupts may be disabled by (i) enabling associated masks and (ii) not disconnecting the interrupts from an associated interrupt chain. A standby loop to wait for a wake up event, a data acquisition event and a house keeping event may being at the step 234.

In the step 236, the standby code 206 may wait for a reason to wake up. Periodically while waiting, the data acquisition tasks and house keeping tasks may be performed in the step 238. Checks may be made of various wake up criteria by polling the appropriate registers and/or inputs in the step 240. If no wake up events have been detected (e.g., the NO branch form step 240), the standby code 206 may return to waiting in the step 232.

When one or more wake up events have been detected (e.g., the YES branch from step 240), the standby code 206 may prepare for returning to the power on state 144 in the step 242. The preparations may include, but are not limited to, (i) returning the system clock to the high frequency, (ii) enabling the non-system clocks, interrupts and data cache and (iii) removing the SDRAM from self-refresh. The standby code 206 may then exit in the step 244.

In the step 246, the application code 204 may call an exit pointer (e.g., EXIT). In the step 248, an exit command (e.g., StandbyExit( )) may be issued to all of the components of the application code 204 (now accessible in the SDRAM). In the step 250, the original call (e.g., SystemStandby( )) may return to the caller.

High level criteria for the standby operations of the video system 100 may be stated as follows, in no particular order:
  Standby operations may not use any clocks other than the system clock signal SYSCLK;
  Standby functions generally runs at a significantly reduced system clock frequency;

Power consumption in the power off state should not exceed a predefined target consumption (e.g., 250 mW);

Standby software operations may use a limited subset of the available hardware;

Standby is generally activated by a single synchronous API call;

The system should be in a known state (e.g., the idle state 148) prior to transitioning to the power off state 142; and Standby generally enables self-termination and reactivation of the consumer application in less than a predetermined time (e.g., less than 1 second).

The software design may be prepared to handle unexpected interrupts that may be caused by exiting the power on state 144. The system may be in the idle state 148 when the API is called. Interrupts occurring in the idle state 148 may be discarded. The application code 204 and any board support packages (e.g., op system kernels) may have direct access to codec circuit 104 hardware. No software module outside the application code 204 should be able to assume direct access to the codec circuit 104 hardware.

Upon entering standby, the application code 204 is generally provided with an opportunity to deterministically disconnect from the codec circuit 104 hardware and other parts of system hardware. For example, interrupt service requests, which periodically DMA presentation data, may be disabled while the system is in the power off state 142. In other examples, open files may be flushed and drive accesses ceased.

A method pointer for the Standby( ) API generally defaults to a NULL pointer. Software components that may take special action to disconnect from the hardware may override and implement the API. Software components that may implant the API may be described as standby-aware.

A process of placing all the standby-aware application code 204 components in standby may be accomplished by using an iterator. The iterator generally cycles through a doubly linked list of application code 104 components checking each for the presence of a Standby( ) implementation. When a Standby( ) implementation is found, an appropriate call may be made. The following pseudo code shows the placement in standby process. The CPlatform::SystemStandby( ) method generally implements:

```
For each application code component
    If (cmp->StandbyEnter != NULL)
        Cmp->StandbyEnter(cmp)
```

The above process may be largely agnostic to order. The order in which the application code components may be called to enter or exit standby is generally unimportant, with a possible exception. Part of the power saving in the power off state 142 may be achieved by holding in reset all but a single processor in the codec circuit 104. In order to allow application code 204 components that run on the reset-held processors to properly enter and exit standby, the reset-held processors may be the last components to enter standby and the very first component to exit.

The power off state 142 may be offered to all levels of customer engagement. To service manufacturing customers better, a feature may be provided in the application code 204 as a "way out" for other applications. Just after all of the application code 204 has entered Standby( ), the API code 208 may deal with non-application code elements. For example, some embodiments may implement direct power controls. In the example, the application code 204 may not be aware of a power switch. With the optionally installable callback, the API code 208 may shut the power off after entry into the power off state 142.

Figure 7:
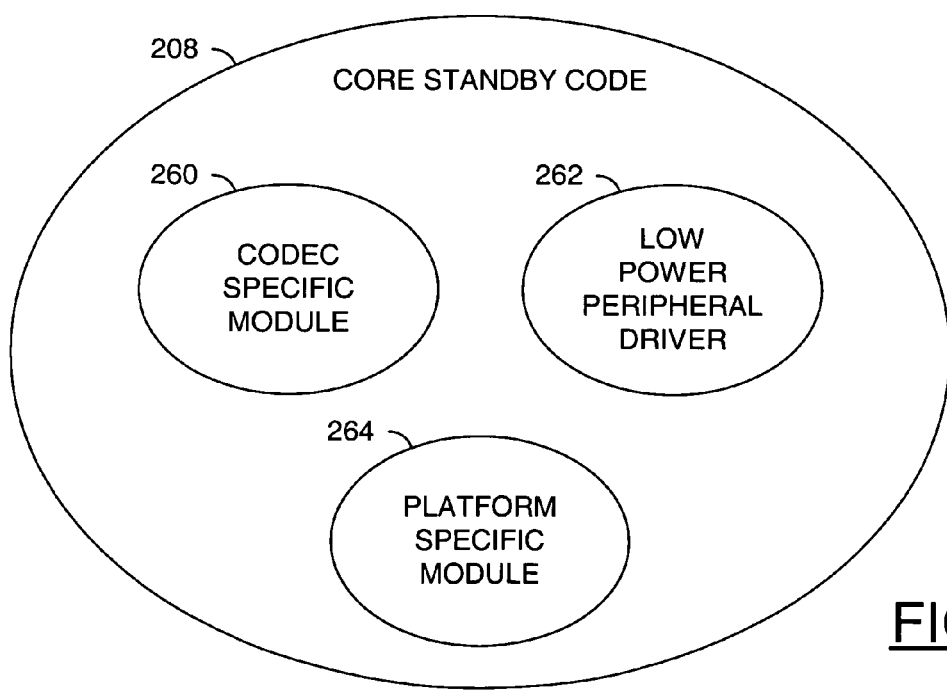
FIG. 7 is a detailed diagram of a core standby code.

Referring to FIG. 7, a detailed diagram of the core standby code 210 is shown. The core standby code 210 generally comprises a module (or component) 260, a module 262 (or component) and a module (or component) 264. The module 260 may be a codec circuit specific module. The module 262 may be a set of low-power specific peripheral drivers. The module 264 may be a platform specific main loop.

The core standby code 210 generally implements the bulk of the low power standby application and may serve three primary purposes. A first purpose may be to execute the steps necessary to save power, such as shutting down the various peripheral clocks. A second purpose may be to monitor the system for a reason to wake up. A third purpose may be to service any functions performed while in the power off state 142.

The standby code 206 may be located at build time to run from the FLASH memory 108. Once the power off state 142 is entered, the standby code 206, by virtue of being executed may be loaded into the I-Cache 162. If the software module maintains a size of less than a size of the I-Cache 162 (e.g., 16 Kbytes), the entire module may eventually run exclusively from the I-Cache 162. However if the software module becomes larger than the I-Cache 162, the processor 160 may have to intermittently re-fetch the appropriate instructions from the FLASH memory 108.

The operating system code 202 is generally not available in the power off state 142. As such, the application code 204 components should not be linked to the standby code 206. Furthermore, interrupts and DMA transfers may not be supported in the power off state 142. The absence of DMA transfers may be because the SDRAM 106 is in self-refresh. Furthermore, all peripheral accesses may be accomplished periodically using polling operations.

The standby mode may be implemented as an operating system thread. Part of CPlatform:SystemStandby may create the thread locating an entry point to the standby code 206 and locating the stack to an internal memory of the codec circuit 104. Creation of the thread may be reconciled with the absence of the operating system 202 in the power off state 142 due to an order of operations. The system may be int-locked on the way into standby before the SDRAM 106 is placed into self-refresh. The thread may simply be used as a convenient mechanism to spawn the standby code 206 and provide the standby code 206 with a pre-located stack.

The exit process is generally started by the standby code 206. At some point, the platform specific standby module 264 may decide that the video system 100 should wake up. To do so, the module 164 may exit an infinite loop and transfer control back to the codec specific module 260. Thereafter, the entry sequence may be reversed and the standby thread exits back to the original caller of CPlatform::SystemStandby.

While hardware elements, such as video capture and the ATA interfaces are disabled in the power off state 142, a number of hardware peripherals generally remain available to the code 206. The available hardware peripherals may include, but are not limited to, the real time clock 116, the IR receiver 126, a universal asynchronous receiver/transmitter (UART), the I2C bus, the SPI bus and a general purpose input/output (GPIO) interface. The peripheral driver module 262 may be arranged to enable the hardware peripheral. A difference between the peripheral driver module 262 and application code 204 component counterparts is that the peripheral drive module 262 components (i) may not be written as application code 204 components and (ii) may operate purely in a polled mode.

The CPlatform component in the application code 204 generally implements an API called InstallStandbyCallbacks( ). The InstallStandbyCallbacks( ) API may take two parameters that are both function pointers. The first, called "enter", is generally called after the application code 204 completes the standby entry process but before entering the power off state 142. The second parameter, called "exit", is generally called immediately after exiting the standby code 206 but before the application code 204 is taken out of standby. The purpose of the callback is to allow the application to maintain, for example, GPIO based control of a power source. The callback is generally not a place to perform various application level software centric operations. Such operations should occur before and after the call to SystemStandby( ).

As has been previously stated, the standby code 206 generally execute from FLASH memory 108. In order to ease the burden of programming the latest standby code image into the FLASH memory 108, the application code 204 may provide an API in a startup group called installStandby( ). The API may compare a first standby code image already in flash with a second standby code in the application code image (downloaded or otherwise). If the two images are not identical, the standby code image found in the application code image may be programmed into the FLASH memory 108.

The function performed by the flow diagrams and state transition diagrams of FIGS. 2 and 6 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMs, EEPROMs, Flash memory, magnetic or optical cards, or any type of media suitable for storing electronic instructions. As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the scope of the invention.

The invention claimed is:

1. A method for transitioning a video system, comprising the steps of:
   (A) executing in a processing circuit a standby code stored in a nonvolatile memory while said video system is in an off state, said off state defining a low power configuration for said processing circuit and a power off condition for said video system, said standby code being responsive to a plurality of wake up conditions to wake up said video system;
   (B) storing an application code in a volatile memory while in said off state, said application code configured to operate said video system while in an on state of said video system;
   (C) transitioning from said off state to said on state upon detection of at least one of said wake up conditions;
   (D) executing in said processing circuit said application code while in said on state to decode video; and
   (E) increasing a frequency of a system clock used by said processing circuit before said transitioning.

2. The method according to claim further comprising the step of:
   enabling a non-system clock before said transitioning.

3. The method according to claim 1, further comprising the step of:
   removing said nonvolatile memory from a self-refresh condition before said transitioning.

4. The method according to claim 1, further comprising the step of:
   enabling a data cache in said processing circuit before said transitioning.

5. The method according to claim 1, further comprising the step of:
   enabling a plurality of interrupts in said processing circuit before said transitioning.

6. The method according to claim 1, further comprising the step of:
   recording a program guide received from an external source into said nonvolatile memory while in said off state.

7. The method according to claim 1, further comprising the step of:
   adjusting a time value while in said off state in response to a broadcast time stamp received from an external source.

8. The method according to claim 1, further comprising the steps of:
   generating a compressed signal by encoding an input video signal;
   storing said compressed signal; and
   generating an output video signal by decoding said compressed signal.

9. The method according to claim 1, further comprising the steps of:
   disabling a plurality of interrupts to said processing circuit;
   placing said volatile memory in a self-refresh condition;
   disabling a data cache of said processing circuit;
   disabling a non-system clock; and
   reducing a frequency of said system clock upon entering said off state.

10. A system comprising:
    a nonvolatile memory configured to store a standby code, said standby code being responsive to a plurality of wake up conditions to wake up said system;
    a volatile memory configured to store an application code while in an off state of said system, said application code configured to operate said system while in an on state of said system;
    a processing circuit configured to (i) execute said standby code while in said off state, said off state defining a low power configuration of said processing circuit and a power off condition of said system, (ii) transition from said off state to said on state upon detection of at least one of said wake up conditions and (iii) execute said application code while in said on state to decode video; and a clock circuit configured to generate a system clock having (i) a first frequency and a second frequency while in said off state and (ii) a third frequency while in said on state.

11. The system according to claim 10, wherein said clock circuit comprises a phase lock loop configured to selectively (i) frequency multiply said system clock while in said on state and (ii) pass said system clock while in said off state.

12. The system according to claim 10, wherein said clock circuit comprises a clock divider configured to selectively (i) frequency divide said system clock and (ii) pass said system clock under control of said standby code.

13. The system according to claim 10, further comprising real time clock generating a real time value adjustable by said processing circuit.

14. The system according to claim 13, further comprising a display driven from said processing circuit and configured to show a real time value while in said off state.

15. The system according to claim 10, wherein said standby code operates independently of an operating system executed by said processing circuit while in said on state.

16. The system according to claim 10, further comprising an interface code configured to initiate said transition from said on state to said off state by a single call from said application code.

17. The system according to claim 16, wherein said interface code is further configured to perform a call return upon transitioning from said off state to said on state.

18. A system comprising:
means for reading from a nonvolatile memory a standby code, said standby code being responsive to a plurality of wake up conditions to wake up said system;
means for reading from a volatile memory an application code while in an off state of said system, said application code configured to operate said system while in an on state of said system;
means for processing configured to (i) execute said standby code while in said off state, said off state defining a low power configuration of said means for processing and a power off condition of said system, (ii) transition from said off state to said on state upon detection of at least one of said wake up conditions and (iii) execute said application code while in said on state to decode video; and
means for increasing a frequency of a system clock used by said processing circuit before said transitioning.

19. A method for transitioning a video system, comprising the steps of:
(A) executing in a processing circuit a standby code stored in a nonvolatile memory while said video system is in an off state, said off state defining a low power configuration for said processing circuit and a power off condition for said video system, said standby code being responsive to a plurality of wake up conditions to wake up said video system;
(B) storing an application code in a volatile memory while in said off state, said application code configured to operate said video system while in an on state of said video system;
(C) transitioning from said off state to said on state upon detection of at least one of said wake up conditions;
(D) executing in said processing circuit said application code while in said on state to decode video; and
(E) enabling a non-system clock before said transitioning.

20. A method for transitioning a video system, comprising the steps of:
(A) executing in a processing circuit a standby code stored in a nonvolatile memory while said video system is in an off state, said off state defining a low power configuration for said processing circuit and a power off condition for said video system, said standby code being responsive to a plurality of wake up conditions to wake up said video system;
(B) storing an application code in a volatile memory while in said off state, said application code configured to operate said video system while in an on state of said video system;
(C) transitioning from said off state to said on state upon detection of at least one of said wake up conditions;
(D) executing in said processing circuit said application code while in said on state to decode video; and
(E) enabling a plurality of interrupts in said processing circuit before said transitioning.

* * * * *